(12) United States Patent
Jin et al.

(10) Patent No.: US 12,341,561 B2
(45) Date of Patent: Jun. 24, 2025

(54) OPTICAL TRANSMISSION CONTROL DEVICE

(71) Applicant: Global Technology Inc., Ningbo (CN)

(72) Inventors: Hao Jin, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 267 days.

(21) Appl. No.: 18/142,204

(22) Filed: May 2, 2023

(65) Prior Publication Data

US 2024/0129038 A1    Apr. 18, 2024

(30) Foreign Application Priority Data

Oct. 13, 2022   (CN) .......................... 202211250959.1

(51) Int. Cl.
    *H04B 10/04*      (2006.01)
    *H04B 10/50*      (2013.01)

(52) U.S. Cl.
    CPC ................................ *H04B 10/503* (2013.01)

(58) Field of Classification Search
CPC .. H04B 10/503; H04B 10/504; H04B 10/505; H04B 10/532; H04B 10/548; H04B 10/516; H04B 10/541; H04B 10/2507; H04B 10/5057; H04B 10/40; H04B 10/60; H04B 10/69; H04B 10/691; H04B 10/50
USPC ....... 398/182, 183, 184, 185, 186, 187, 188, 398/192, 193, 194, 195, 196, 198, 199, 398/200, 201, 202, 208, 209, 135, 137, 398/138, 139, 158, 159, 33, 38, 164

See application file for complete search history.

(56) References Cited

U.S. PATENT DOCUMENTS

| | | | | |
|---|---|---|---|---|
| 7,215,891 | B1 * | 5/2007 | Chiang | H04B 10/40 398/195 |
| 2012/0301151 | A1 * | 11/2012 | Hu | H04B 10/40 315/117 |
| 2013/0170840 | A1 * | 7/2013 | Chang | H04B 10/2575 398/115 |

* cited by examiner

*Primary Examiner* — Hanh Phan
(74) *Attorney, Agent, or Firm* — Grossman Tucker Perreault & Pfleger, PLLC

(57) ABSTRACT

An optical transmission control device comprises a light emitting sub-component, a first and a second signal transmission line, a laser driving component, a switching component, and a microcontroller. The laser driving component is connected to the light emitting sub-component. The switching component has two input terminals, an output terminal, and a controlling terminal, the two input terminals are connected to the first signal transmission line and the laser driving component, respectively, and the output terminal is connected to the light emitting sub-component. The microcontroller receives a data signal and executes: controlling the laser driving component to generate and output a driving signal to the light emitting sub-component according to the data signal; and controlling the switching component to output the analog signal according to the data signal, or controlling the laser driving component to process the digital signal and control the switching component to output the processed digital signal.

8 Claims, 3 Drawing Sheets

OPTICAL TRANSMISSION CONTROL DEVICE

CROSS-REFERENCE TO RELATED APPLICATIONS

This non-provisional application claims priority under 35 U.S.C. § 119(a) on Patent Application No(s). 202211250959.1 filed in China on Oct. 13, 2022, the entire contents of which are hereby incorporated by reference.

BACKGROUND

1. Technical Field

This disclosure relates to the technical field of optical communication, especially to an optical transmission control device.

2. Related Art

With the internet developing rapidly, new applications of the internet prospering, and the amount of data transmitted increasing day by day, requirements over the internet become more and more demanding. With the current development of internet communication, the capacity of the internet may no longer be able to support the rising and growing future network traffic. Therefore, to solve the described issues, an optimized and improved configuration of the transmission device and simplification over the complexity of the internet are needed.

SUMMARY

Accordingly, this disclosure provides an optical transmission control device, which integrates digital signal channels and analog signal channels, thereby making the configuration of signal channels more flexible for application.

According to one or more embodiments of this disclosure, an optical transmission control device comprises a light emitting sub-component, a first signal transmission line, a second signal transmission line, a laser driving component, a switching component, and a microcontroller. The first signal transmission line is configured to receive an analog signal. The second signal transmission line is configured to receive a digital signal. The laser driving component is connected to the light emitting sub-component and the second signal transmission line. The switching component has two input terminals, an output terminal, and a controlling terminal, and the two input terminals are connected to the first signal transmission line and the laser driving component, respectively, the output terminal is connected to the light emitting sub-component. The microcontroller is connected to the laser driving component and the controlling terminal and configured to receive a data signal and executes: controlling the laser driving component to generate and output a driving signal to the light emitting sub-component according to the data signal; and controlling the switching component to output the analog signal through the output terminal according to the data signal, or controlling the laser driving component to process the digital signal and control the switching component to output the digital signal that is processed through the output terminal.

According to one or more embodiments of this disclosure, an optical transmission control device comprises a light receiving sub-component, a switching component, a microcontroller, a first signal transmission line, and a second signal transmission line. The light receiving sub-component is configured to receive an analog signal or a digital signal. The switching component has an input terminal, two output terminals, and a controlling terminal, and the input terminal of the switching component is connected to the light receiving sub-component. The microcontroller is connected to the controlling terminal of the switching component and the light receiving sub-component, and is configured to control one of the two output terminals to output the analog signal according to the analog signal, or control another one of the two output terminals to output the digital signal. The first signal transmission line is connected to the one of the two output terminals and configured to output the analog signal. The second signal transmission line is connected to the another one of the two output terminals and configured to output the digital signal.

In view of the above description, the optical transmission control device of the present disclosure, through the configuration of the switching component, integrates transmission function for analog signal transmission and digital signal transmission into a module and selectively transmits analog signal and digital signal through a channel, thereby providing an optical transmission control device with low power consumption, small size, and simple organization, to make configuration of signal more flexible and reduce the complexity of constructing network.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
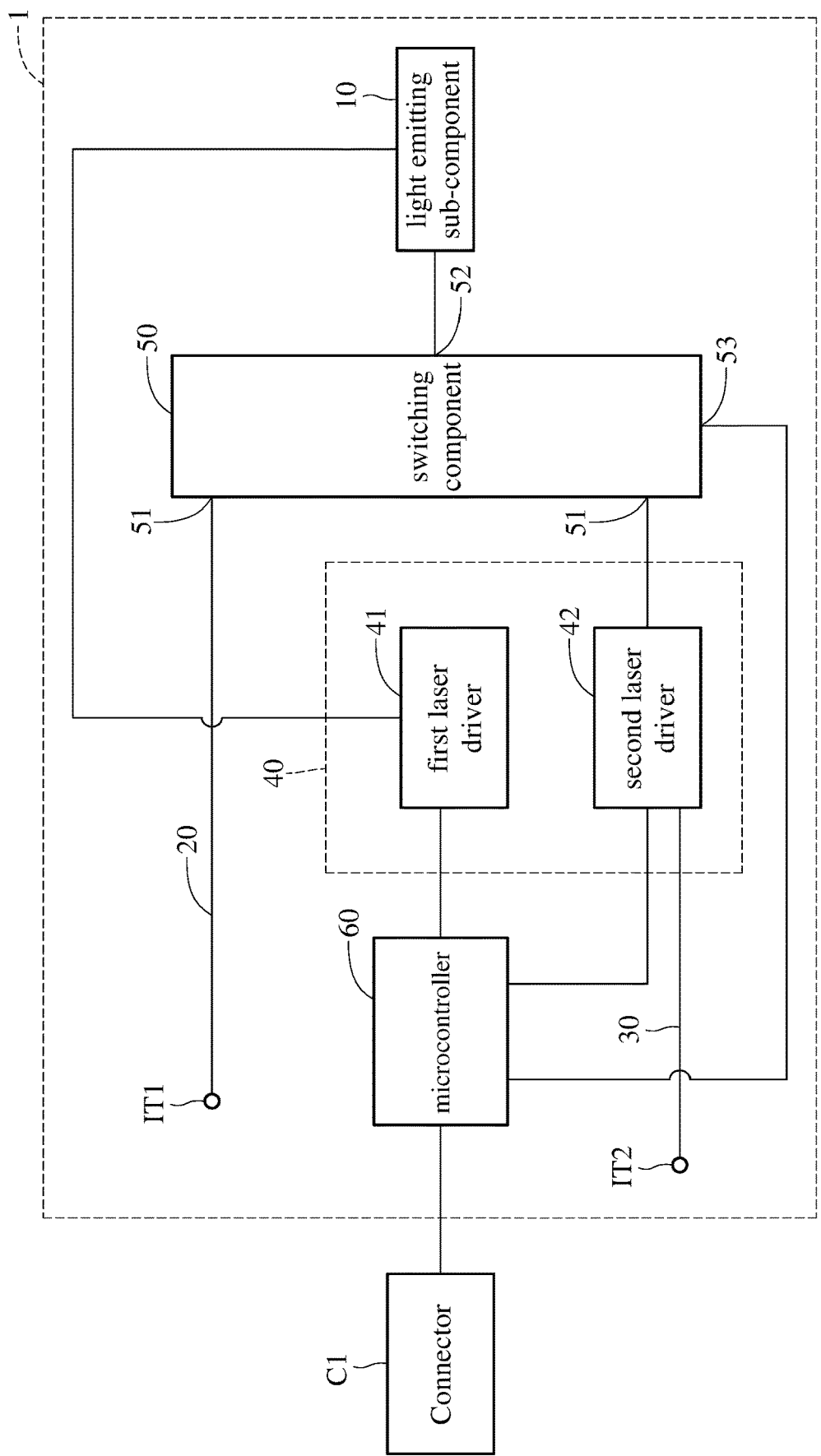
FIG. 1 is a functional block diagram of an optical transmission control device according to an embodiment of the present disclosure.

Please refer to FIG. 1 which is a functional block diagram of an optical transmission control device according to an embodiment of the present disclosure. As shown in FIG. 1, the optical transmission control device 1 includes a light emitting sub-component 10, a first signal transmission line 20, a second signal transmission line 30, a laser driving component 40, a switching component 50, and a microcontroller 60. The first signal transmission line 20 is configured to receive an analog signal. The second signal transmission line 30 is configured to receive a digital signal. The laser driving component 40 is connected to the light emitting sub-component 10 and the second signal transmission line 30. The switching component 50 has two input terminals 51, an output terminal 52, and a controlling terminal 53. The two input terminals 51 are connected to the first signal transmission line 20 and the laser driving component 40, respectively, and the output terminal 52 is connected to the light emitting sub-component 10. The microcontroller 60 is connected to the laser driving component 40 and the controlling terminal 53. The microcontroller 60 may be configured to receive a data signal through a connector C1 for controlling the laser driving component 40 to generate and output a driving signal to the light emitting sub-component 10 according to the data signal, and controlling the switching component 50 to output the analog signal through the output terminal 52 according to the data signal. The microcontroller 60 might be also configured to control the laser driving component 40 to process the digital signal and control the switching component 50 to output the processed digital signal through the output terminal 52 to the light emitting sub-component 10.

In the present embodiment, the light emitting sub-component 10 may be implemented by a transmitter optical subassembly (TOSA), which can include components such as wavelength division multiplexing (WDM), photodetector (PD), optical modulator, optical splitter, modulator driving element, trans-impedance amplifier among others. The first signal transmission line 20 may have a signal input terminal IT1 and a signal output terminal. The second signal transmission line 30 similarly may have a signal input terminal IT2 and a signal output terminal. The signal input terminal IT1 of the first signal transmission line 20 is configured to receive the analog signal, which may be, for example, a radio-frequency signal. The signal output terminal of the first signal transmission line 20 is connected to the input terminal 51 of the switching component 50. The signal input terminal IT2 of the second signal transmission line 30 is configured to receive the digital signal, and the signal output terminal of the second signal transmission line 30 is connected to the laser driving component 40. Furthermore, the input terminal IT1 may receive the analog signal from the connector connected to an antenna array (not shown), and the input terminal IT2 may receive the digital signal from a digital optical module array (not shown either). In the present embodiment, the laser driving component 40 may include a first laser driver 41 and a second laser driver 42. The first laser driver 41 may be connected to the microcontroller 60 and the light emitting sub-component 10, and controlled by the microcontroller 60 to generate and output the driving signal to the light emitting sub-component 10. The second laser driver 42 may be connected to the signal output terminal and input terminal 51 of the second signal transmission line 30, and process the digital signal. In one implementation, the first laser driver 41 and the second laser driver 42 are independently disposed. In another implementation, the first laser driver 41 and the second laser driver 42 may be integrated together.

In the present embodiment, the light emitting sub-component 10, the first laser driver 41, the second laser driver 42 and the microcontroller 60 of the optical transmission control device 1 may be connected to an external power supply, a battery or other power supplying terminal through connectors respectively, to receive power (of 3.3V, for instance).

Specifically, the data signal might include an analog command or a digital command, and the driving signal might include a first driving signal and a second driving signal. The microcontroller 60 controls the first laser driver 41 to generate and output the first driving signal to the light emitting sub-component 10 when receiving the data signal including the analog command, and controls the switching component 50 to switch to be connected to the input terminal 51 of the first signal transmission line 20 allowing for the output terminal 52 of the switching component 50 to output the analog signal to the light emitting sub-component 10. The microcontroller 60 controls the first laser driver 41 to generate and output the second driving signal to the light emitting sub-component 10 when receiving the data signal including the digital command, which might cause the switching component 50 to switch to be connected to the input terminal 51 coupled to the second laser driver 42. The second laser driver 42 processes the digital signal and transmits the processed digital signal to the input terminal 51 connected to the second laser driver 42. As such, the output terminal 52 of the switching component 50 outputs the digital signal to the light emitting sub-component 10.

In view of the above description, the present disclosure provides an optical transmission control device of low-power consumption and small size, which may integrate a digital signal and an analog signal to be transmitted in the same communication channel.

Figure 2:
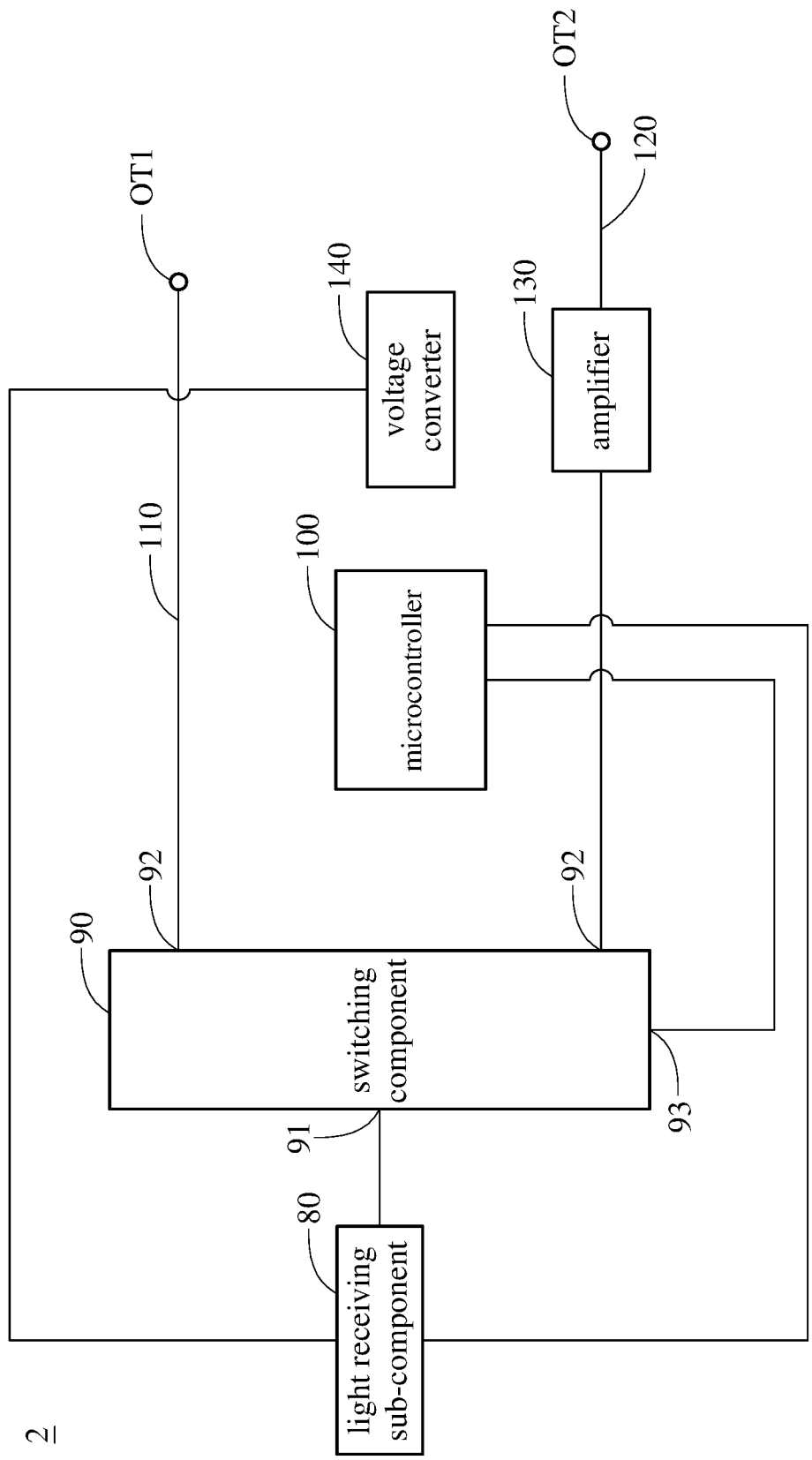
FIG. 2 is a functional block diagram of an optical transmission control device according to another embodiment of the present disclosure.

Please refer to FIG. 2 which is a functional block diagram of an optical transmission control device according to another embodiment of the present disclosure. As shown in FIG. 2, the optical transmission control device 2 includes a light receiving sub-component 80, a switching component 90, and a microcontroller 100. The light receiving sub-component 80 may be implemented by a receiver optical subassembly (ROSA), which can include components such as wavelength division multiplexing (WDM), photodetector (PD), optical modulator, optical splitter, modulator driving element, trans-impedance amplifier among others. The light receiving sub-component 80 is configured to receive an analog signal or a digital signal. The switching component 90 has an input terminal 91 connected to the light receiving sub-component 80, two output terminals 92, and a controlling terminal 93. The microcontroller 100 is connected to the controlling terminal 93 of the switching component 90 and the light receiving sub-component 80, and is configured to control one of the two output terminals 92 to output the analog signal, or the other one of the two output terminals 92 to output the digital signal. The first signal transmission line 110 is connected to one of the two output terminals 92 and configured to output the analog signal. The second signal transmission line 120 is connected to another output terminal 92 and configured to output the digital signal.

In the present embodiment, the first signal transmission line 110 may have a signal input terminal and a signal output terminal OT1, and the second signal transmission line 120 may also have a signal input terminal and a signal output terminal OT2. The signal input terminal of the first signal transmission line 110 is connected to one of the two output terminals 92, and the output terminal OT1 of the first signal transmission line 110 outputs the analog signal. The signal input terminal of the second signal transmission line 120 is connected to another output terminal 92, and the output terminal OT2 of the second signal transmission line 120 outputs the digital signal.

In the present embodiment, an amplifier 130 and a voltage converter 140 may be further included. The amplifier 130 is connected to one output terminal 92, and the signal input terminal of the second signal transmission line 120 (which as previously defined could be the end other than OT2), and the amplifier 130 may amplify the digital signal. The voltage converter 140 is connected to the light receiving sub-component 80, receives power (of 3.3 V, for instance) from a power supply (for example, connected to an external power supply, a battery or other power supplying terminal through the connector), and converts the received power to supply it to the light receiving sub-component 80. In one implementation, the voltage converter 140 may be a dc-to-dc converter. It should be noted that, the light receiving sub-component 80 can be directly connected to the power supply without the voltage converter 140, which is an element optionally disposed. In addition, the microcontroller 100 and the amplifier 130 may be connected to an external power supply, a battery, a power supply terminal, etc., respectively, to receive power (for instance, 3.3 V) through the connector.

Specifically, the microcontroller 100 may determine that the analog signal is input into the switching component 90 through the light receiving sub-component 80, and control the switching component 90 to switch to be connected to the output terminal 92 of the first signal transmission 110, allowing for the output of the analog signal. The microcontroller 100 may determine that the digital signal is input into the switching component 90 through the light receiving sub-component 80, and control the switching component 90 to switch to be connected to the output terminal 92 that is coupled to the amplifier 130, allowing for the output of the amplified digital signal through the output terminal OT2.

It should be noted that, the optical transmission control device of one or more of embodiments of the present disclosure may be implemented as a radio over fiber (ROF) module, and may be applied to on-tower (outdoor) and/or under-tower (indoor) optical module array.

Figure 3:
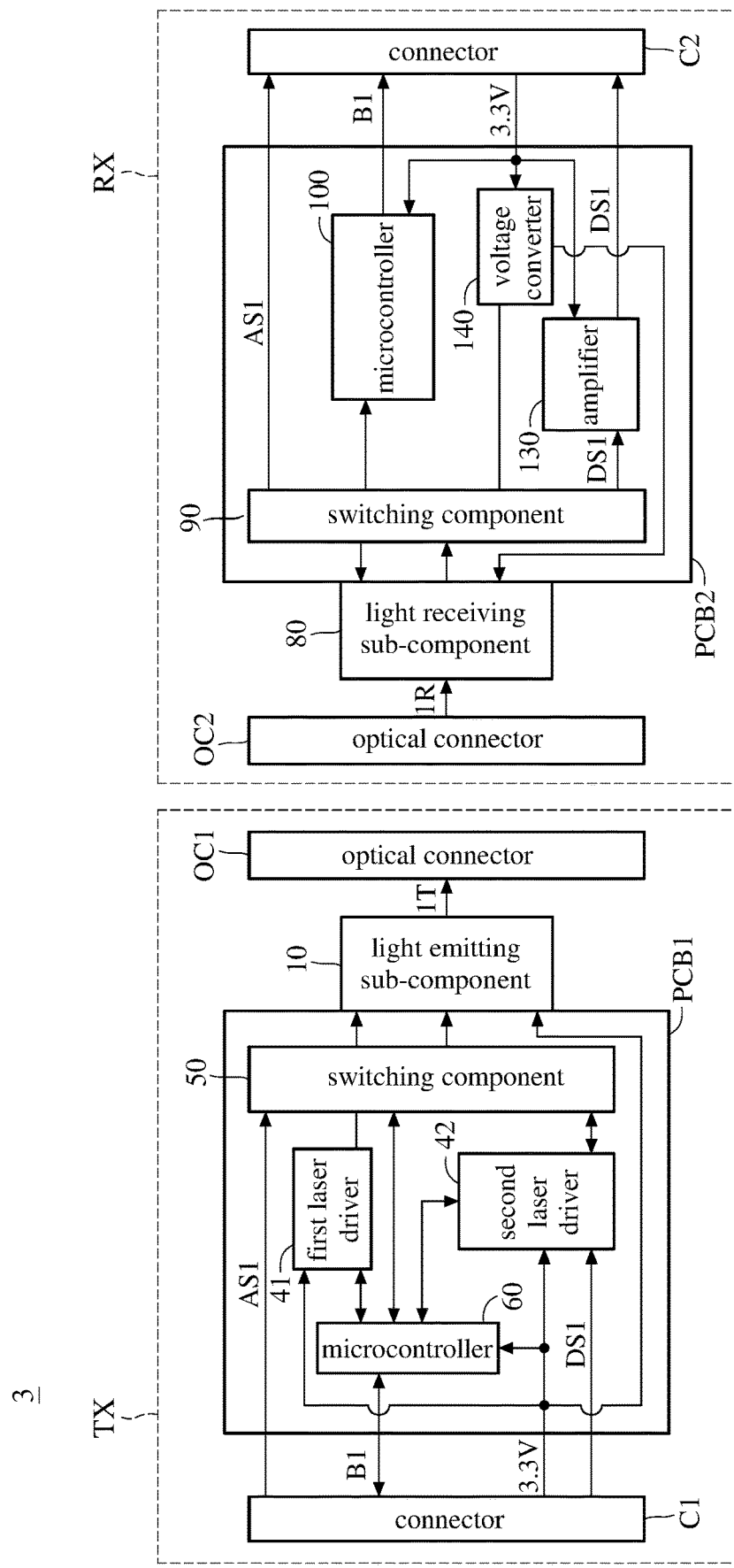
FIG. 3 is a functional block diagram of an optical transmission control device according to still another embodiment of the present disclosure.

Please refer to FIG. 3 which is a functional block diagram of an optical transmission control device according to still another embodiment of the present disclosure. As shown in FIG. 3, the optical transmission control device 3 includes a light emitting control circuit located at a transmission terminal TX and a light receiving control circuit located at a receiving terminal RX.

The light emitting control circuit includes a light emitting sub-component 10, a first laser driver 41, a second laser driver 42, a switching component 50, a microcontroller 60, a connector C1, and an optical connector OC1. The light emitting sub-component 10, the first laser driver 41, the second laser driver 42, the switching component 50, and the microcontroller 60 are disposed on the printed circuit board PCB1. The configuration and function of the light emitting sub-component 10, the first laser driver 41, the second laser driver 42, the switching component 50, and the microcontroller 60 could the same with the components and drivers of the embodiment illustrated in FIG. 1. The connector C1 is connected to the first signal transmission line 20 and the second signal transmission line 30 illustrated in FIG. 1, so that it can receive analog signal AS1 and digital signal DS1. The connector C1 might be connected to the microcontroller 60 through a two-line type serial bus circuit B1. The light emitting sub-component 10 is connected to the optical connector OC1 through an optical fiber.

The optical receiving control circuit includes a light receiving sub-component 80, a switching component 90, a microcontroller 100, an amplifier 130, a voltage converter 140, a connector C2, and an optical connector OC2. The light receiving sub-component 80, the switching component 90, the microcontroller 100, the amplifier 130, and the voltage converter 140 are disposed on the printed circuit board PCB2. The configuration and function of the light receiving sub-component 80, the switching component 90, the microcontroller 100, the amplifier 130, the voltage converter 140 could be the same with the components and drivers of the embodiment illustrated in FIG. 1. The connector C2 is connected to the first signal transmission line 110 and the second signal transmission line 120 illustrated in FIG. 2 so that it can output the analog signal AS1 and the digital signal DS1, and connected to the microcontroller 100 through another two-line type serial bus circuit B 1. The optical connector OC2 is connected to the optical connector OC1 through an optical fiber. With the above arrangement, the light emitting control circuit located at the transmission terminal TX transmits the analog signal AS1 and the digital signal DS1 to the light receiving control circuit located at the receiving terminal RX through the optical connector OC1. In addition, the light emitting control circuit located at the transmission terminal TX may also transmit two analog signals or two digital signals to the light receiving control circuit located at the receiving terminal RX through the same optical connector OC1 in another embodiment.

The light emitting control circuit and the light receiving control circuit of the optical transmission control device illustrated in FIG. 3 can be a circuit in the optical receiving and transmitting module disposed on the tower (outdoor), or a circuit in the optical receiving and transmitting module disposed under the tower (indoor), or circuits in the optical receiving and transmitting modules disposed on and under the tower, respectively. The optical transmission control device 3 illustrated in FIG. 3 could be implemented in an optical module of 1T1R (one transmission and one receipt) form, or other optical modules of 3T3R or 4T4R form. In addition, since the light emitting control circuit can transmit the analog signal AS1 and the digital signal DS1 and is disposed on the printed circuit board PCB1, and the light receiving control circuit can receive the analog signal AS1 and the digital signal DS1 and is disposed on the printed circuit board PCB2, the signal configuration may be more flexible, the size of the optical transmission control device may be smaller, the power consumption may be reduced, and the complexity of constructing network may be lowered.

In view of the above description, the optical transmission control device of the present disclosure selectively transmits the analog signal and the digital signal in one channel through the configuration of the switching component, thereby making the signal configuration more flexible and reducing the complexity of constructing network.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:
1. An optical transmission control device, comprising:
a light emitting sub-component;
a first signal transmission line configured to receive an analog signal;
a second signal transmission line configured to receive a digital signal;
a laser driving component connected to the light emitting sub-component and the second signal transmission line;
a switching component with two input terminals, an output terminal, and a controlling terminal, the two input terminals connected to the first signal transmission line and the laser driving component, respectively, and the output terminal connected to the light emitting sub-component; and a microcontroller connected to the laser driving component and the controlling terminal, and configured to receive a data signal and execute:

controlling the laser driving component to generate and output a driving signal to the light emitting sub-component according to the data signal; and controlling the switching component to output the analog signal through the output terminal according to the data signal, or controlling the laser driving component to process the digital signal and control the switching component to output the digital signal that is processed through the output terminal.

2. The optical transmission control device of claim 1, wherein the laser driving component comprises:

a first laser driver connected to the light emitting sub-component and the microcontroller; and a second laser driver connected to the second signal transmission line, the switching component and the microcontroller, and configured to be controlled by the microcontroller to process the digital signal;

wherein the data signal comprises an analog command and a digital command, the driving signal comprises a first driving signal or a second driving signal, the microcontroller controls the first laser driver to generate and output the first driving signal to the light emitting sub-component according to the analog command or controls the first laser driver to generate and output the second driving signal to the light emitting sub-component according to the digital command.

3. The optical transmission control device of claim 1, wherein the switching component is a first switching component, the microcontroller is a first microcontroller, and the optical transmission control device further comprises:

a light receiving sub-component;

a second switching component with an input terminal, two output terminals, and a controlling terminal, the input terminal of the second switching component connected to the light receiving sub-component; and a second microcontroller connected to the controlling terminal of the second switching component and the light receiving sub-component, and configured to control one of the two output terminals of the second switching component to output the analog signal according to the analog signal, or control another one of the two output terminals of the second switching component to output the digital signal according to the digital signal.

4. The optical transmission control device of claim 3, further comprising a voltage converter, the voltage converter connected to the light receiving sub-component and supplying power to the light receiving sub-component.

5. The optical transmission control device of claim 3, further comprising an amplifier, the amplifier connected to the another one of the two output terminals and configured to amplify the digital signal.

6. An optical transmission control device, comprising:

a light receiving sub-component configured to receive an analog signal or a digital signal;

a switching component with an input terminal, two output terminals, and a controlling terminal, the input terminal of the switching component connected to the light receiving sub-component;

a microcontroller connected to the controlling terminal of the switching component and the light receiving sub-component, and configured to control one of the two output terminals to output the analog signal according to the analog signal, or control another one of the two output terminals to output the digital signal;

a first signal transmission line connected to the one of the two output terminals and configured to output the analog signal; and a second signal transmission line connected to the another one of the two output terminals and configured to output the digital signal.

7. The optical transmission control device of claim 6, further comprising a voltage converter, the voltage converter connected to the light receiving sub-component and supplying power to the light receiving sub-component.

8. The optical transmission control device of claim 6, further comprising an amplifier, the amplifier connected to the another one of the two output terminals and configured to amplify the analog signal.

* * * * *